US008682202B2

(12) United States Patent
Miyazaki et al.

(10) Patent No.: US 8,682,202 B2
(45) Date of Patent: Mar. 25, 2014

(54) IMAGE FORMING APPARATUS THAT INCLUDES OPERATION CONTROL UNIT CONTROLLING A PLURALITY OF FANS FOR DISCHARGING OZONE AND A FIXING DEVICE

(75) Inventors: Yasunari Miyazaki, Shizuoka-ken (JP); Tomoyuki Kato, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 328 days.

(21) Appl. No.: 13/160,791

(22) Filed: Jun. 15, 2011

(65) Prior Publication Data

US 2011/0311262 A1 Dec. 22, 2011

Related U.S. Application Data

(60) Provisional application No. 61/355,798, filed on Jun. 17, 2010.

(51) Int. Cl.
*G03G 21/20* (2006.01)
*G01N 21/75* (2006.01)

(52) U.S. Cl.
USPC .................. 399/92; 399/91; 399/93; 399/94; 422/186.07; 422/186.15

(58) Field of Classification Search
USPC ......... 399/44, 91, 92, 93; 422/186.07, 186.15
See application file for complete search history.

(56) References Cited

U.S. PATENT DOCUMENTS

| | | | | |
|---|---|---|---|---|
| 6,753,973 | B2 * | 6/2004 | Hashimoto et al. | 358/1.14 |
| 2002/0085856 | A1 * | 7/2002 | Kuwabara | 399/92 |
| 2006/0056874 | A1 * | 3/2006 | Kim et al. | 399/93 |
| 2010/0254726 | A1 * | 10/2010 | Endo | 399/69 |

FOREIGN PATENT DOCUMENTS

| | | | |
|---|---|---|---|
| JP | 09-212066 | | 8/1997 |
| JP | 11-184354 | | 7/1999 |
| JP | 2001228743 | A * | 8/2001 |
| JP | 2003-118203 | | 4/2003 |

* cited by examiner

*Primary Examiner* — David Gray
*Assistant Examiner* — Francis Gray
(74) *Attorney, Agent, or Firm* — Turocy & Watson, LLP

(57) ABSTRACT

An image forming apparatus including: a photo conductor; a charging unit; a plurality of fans; an information acquiring unit acquiring at least any one of print process information, which is information on a print process, or apparatus information, which is information on the internal environment of the apparatus; a reference determining unit that determines whether the print process or the internal environment of the apparatus satisfies the reference by using the print process information or the apparatus information; and an operation control unit including a first control mode that operates and stops the fans and the fixing device when the reference determining unit determines that the reference is not satisfied, and a second control mode that is performed before the first control mode is performed and stops the fixing device while driving the fans, when the reference determining unit determines that the reference is satisfied.

12 Claims, 8 Drawing Sheets

IMAGE FORMING APPARATUS THAT INCLUDES OPERATION CONTROL UNIT CONTROLLING A PLURALITY OF FANS FOR DISCHARGING OZONE AND A FIXING DEVICE

CROSS-REFERENCE TO RELATED APPLICATION

This application is based upon and claims the benefit of priority from U.S. provisional application 61/355,798, filed on Jun. 17, 2010; the entire contents of which are incorporated herein by reference.

FIELD

Embodiments described herein relate generally to a technology relating to an electrophotographic type image forming apparatus.

BACKGROUND

In the related art, in electrophotographic type image forming apparatuses, when an operation state (sleep mode) that prevents power consumption by cutting power for a fixing device is implemented, the fixing device is stopped and the driving of a fan in the image forming apparatuses is also stopped.

In this configuration, for example, when switching from after printing is finished to the sleep mode is set to a relatively short time, the driving time of the fan after the printing is finished is correspondingly reduced. Therefore, for example, when switching to the sleep mode is implemented in a relatively short time after a print job accompanied with a large amount of printing, the driving time of the fan decreases, such that the ozone produced by charging photo conductors in the apparatus cannot be discharged completely, and as a result, the material of the apparatus is deteriorated by the ozone.

DETAILED DESCRIPTION

An image forming apparatus of an embodiment includes: a photo conductor; a charging unit that charges the surface of the photo conductor; a fixing device that fixes a toner image transferred on a recording medium from the photo conductor; a plurality of fans that discharges air containing ozone produced by charging of the charging unit to the outside of the apparatus, by generating the flow of the air from the inside of the apparatus to the outside of the apparatus; an information acquiring unit that acquires at least any one of print process information, which is information on a print process, and apparatus information, which is information on the internal environment of the apparatus; a determining unit that determines the print process or the internal environment of the apparatus by using at least any one of the print process information and the apparatus information that are acquired by the information acquiring unit; and an operation control unit including a first control mode that is performed in accordance with the determined result of the determining unit and stops the fans and the fixing device and a second control mode that is performed before the first control mode is performed and stops the fixing device while driving the fans.

Figure 1:
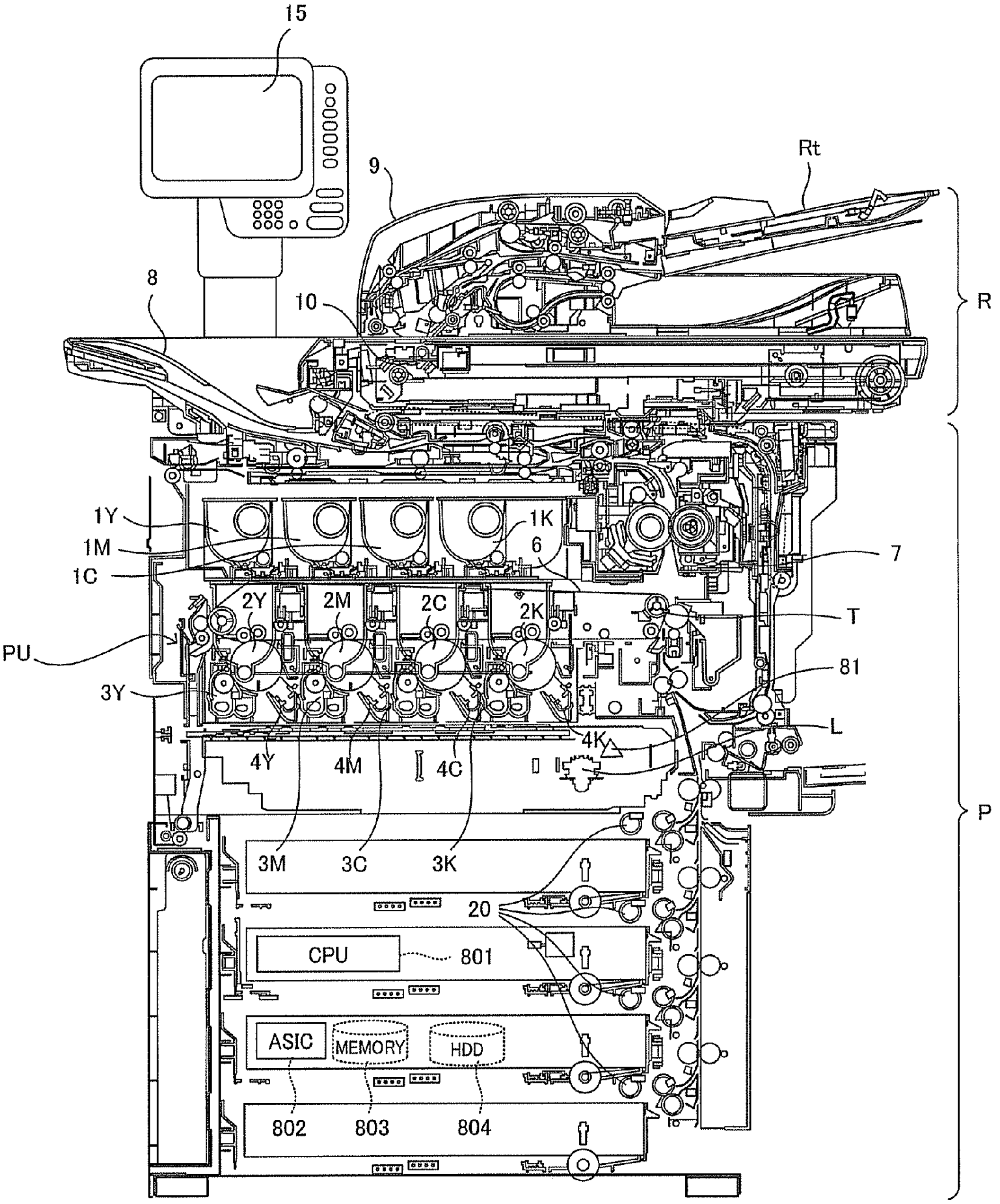
FIG. 1 is a view schematically showing an image forming apparatus of an embodiment.

FIG. 1 is a longitudinal cross-sectional view showing a schematic configuration of an MFP (Multi Function Peripheral) that is an example of an image forming apparatus according to the embodiment.

As shown in FIG. 1, the image forming apparatus according to the embodiment includes an image reading unit R and an image forming unit P.

The image reading unit R has a function of scanning and reading an image of a sheet document or a book document.

The image forming unit P has a function of forming a toner image on a sheet on the basis of an image read from the document by the image reading unit R or image data transmitted to the MFP from an external device.

The image reading unit R is equipped with an ADF (Auto Document Feeder) 9 that automatically conveys documents to a predetermined image reading position and images of a document placed on a document tray (a predetermined document placing table) Rt or a document placed on a document table that is not shown, which are automatically conveyed by the auto document feeder 9 are read by a scanning optical system 10.

Further, the image forming unit P includes a pickup roller 20, a process unit PU, a fixing device 7, and discharge tray 8, toner cartridges 1Y to 1K (colorant cartridges), and a laser unit L. The process unit PU includes photo conductor drums 2Y to 2K, developing units 3Y to 3K, chargers 4Y to 4K, and an intermediate transfer belt 6.

Further, the MFP according to the embodiment includes a CPU 801, an ASIC (Application Specific Integrated Circuit) 802, a memory 803, and an HDD (Hard Disk Drive) 804 (see FIG. 1). The CPU 801 has a function of performing various processes in the MFP and has a function of performing various functions by executing programs temporarily stored in the memory 803. Further, needless to say, the CPU 801 may be replaced by an MPU (Micro Processing Unit) that can perform the same calculation. Further, similarly, the HDD 804 can be replaced by a storage device, such as a flash memory, for example. The ASIC 802 is equipped with hardware (a circuit) that controls various functions of the MFP. The memory 803 may be implemented, for example, by RAM (Random Access Memory), ROM (Read Only Memory), DRAM (Dynamic Random Access Memory), SRAM (Static Random Access Memory), VRAM (Video RAM) or the like, and has a function of temporarily storing a variety of information or programs used by the MFP and log information of performed processes or the like.

Further, the MFP of the embodiment includes an operation unit 15 that allows a user to input a request for various processes relating to the MFP. The operation unit 15 is composed of a power switch that switches the power transmission state (ON/OFF) from a power supply that is not shown to the MFP, a graphical display equipped with a touch panel sensor, and a process input button frequently used for numbers, start or cancel, and a status indication LED.

Further, in the embodiment, the image forming apparatus includes a temperature sensor 81 that detects internal temperature of the apparatus.

Hereinafter, a copy process will be schematically described as an example process in the MFP according to the embodiment.

First, a sheet picked up from a cassette by the pickup roller 20 is supplied inside a sheet convey path. The sheet supplied inside the sheet conveying path is conveyed in a predetermined convey direction by a plurality of pairs of rollers.

Further, images of a plurality of sheet documents automatically and continuously conveyed by the auto document feeder 9 are read by the scanning optical system 10 at a predetermined image-reading position.

Next, toner images are formed by the process unit PU on the basis of image data of the images read from the documents by the image reading unit R.

First, the surfaces (photosensitive surfaces) of the photo conductor drums 2Y, 2M, 2C, and 2K for transferring the toner images of yellow (Y), magenta (M), cyan (c), and black (K) to the sheet are uniformly charged by corona discharge from the chargers 4Y to 4K (corresponding to charging units).

Further, for example, ozone is produced by the charging in the image forming apparatus.

Next, the charged photosensitive surfaces are exposed in response to an image signal from the laser unit L. As a result, electrostatic latent images are formed on the photosensitive surfaces. Further, toner is supplied to the photosensitive surfaces of the photo conductor drums 2Y to 2K where the electrostatic latent images are formed, from the developing units 3Y, 3M, 3C, and 3K. Accordingly, the electrostatic latent images formed on the photosensitive surfaces of the photo conductor drums 2Y to 2K are developed (toner images are formed). The developing units 3Y to 3K are supplied with toner by the toner cartridges 1Y to 1K.

The toner images formed on the photo conductor drums 2Y to 2K, as described above, are transferred onto the belt surface of the intermediate transfer belt 6 (so-called, primary transferring). Next, the toner images conveyed by rotation of the intermediate transfer belt 6 are transferred onto a conveyed sheet, at a predetermined secondary transfer position T.

The toner images transferred on the sheet are pressed and heat-fixed with respect to the sheet by a heating roller of the fixing device 7.

The sheet where the toner images are heat-fixed is conveyed inside the conveying path by a plurality of pairs of conveying rollers and then sequentially discharged onto the discharge tray 8.

Figure 2:
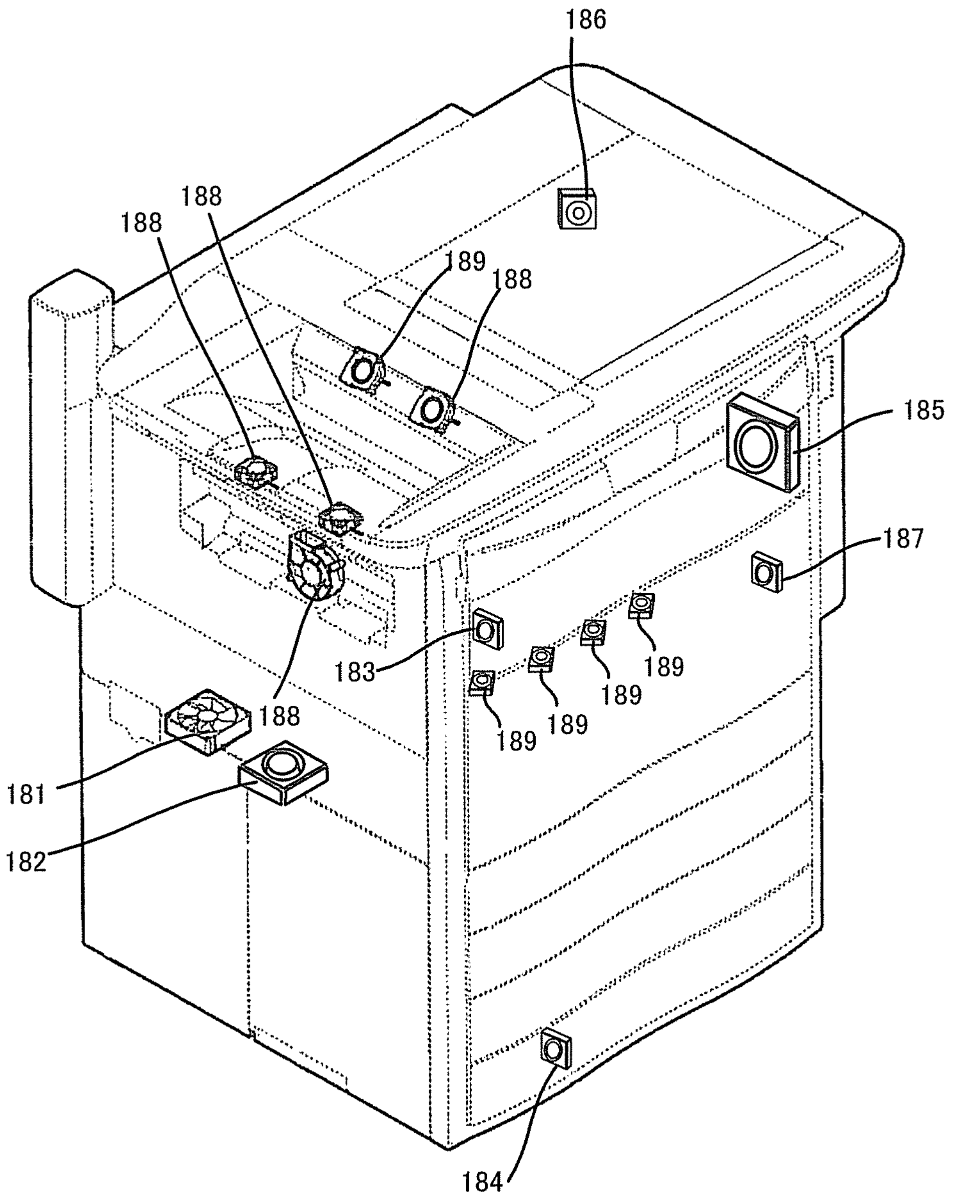
FIG. 2 is a view schematically showing a fan of the image forming apparatus.
Figure 3:
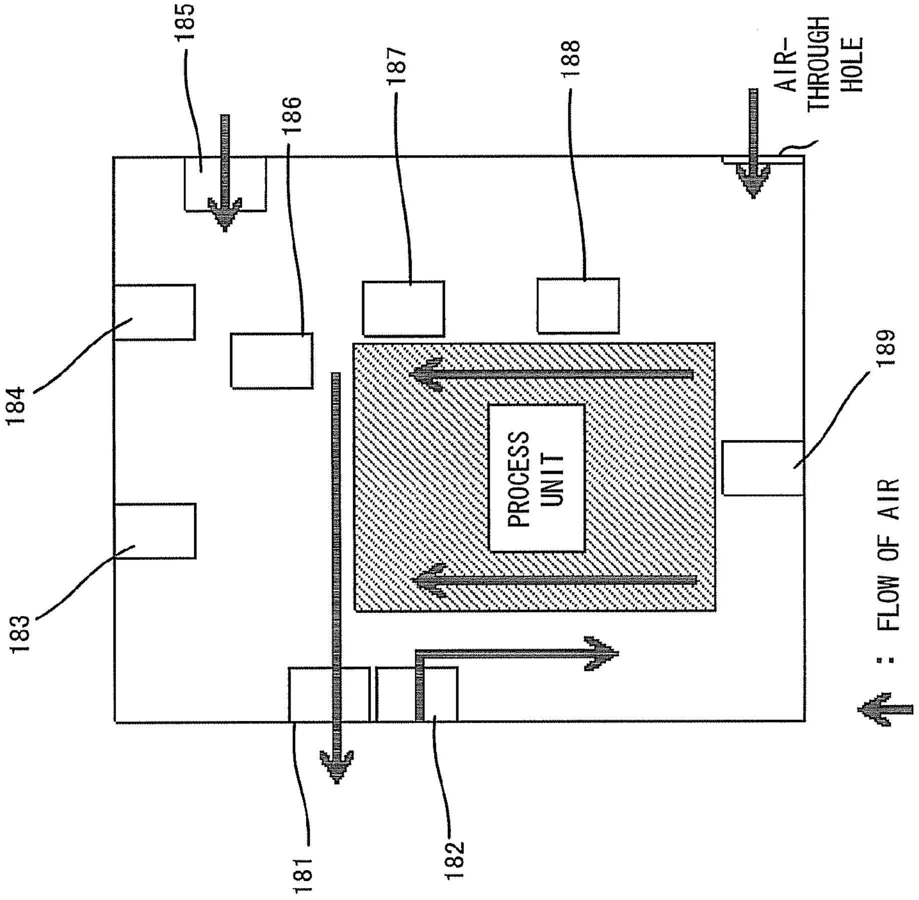
FIG. 3 is a view showing an example of arrangement of the fan and the flow of air.

Further, in the embodiment, as shown in FIG. 2 and FIG. 3, as an example, the MFP is equipped with a plurality of fans that has a function of supplying air into the apparatus, discharging the air in the apparatus to the outside of the apparatus, and generating flow of the air in the apparatus. For example, an ozone discharge fan 181 sucks and discharges the ozone produced when the photo conductor drums are charged, to the outside of the apparatus, as one of the functions. Further, a charger blowing fan 189 prevents the chargers 4Y to 4K from being stained by blowing air to the chargers 4Y to 4K, as one of the functions. Air flows into the apparatus, the inflow air cools the units, and discharges the ozone, and then is discharged out of the apparatus, by operation of the fans. That is, the plurality of fans of the image forming apparatus discharge the air containing the ozone produced by charging of the charging unit to the outside of the apparatus by generating the flow of air from the inside of the apparatus to the outside of the apparatus.

Further, in the following description, the ozone discharge fan 181, an EPU cooling fan 182, a SYS and HDD cooling fan 183, a power unit cooling fan 184, a main body-inside cooling fan 185, a scanner unit cooling fan 186, fixing and discharging unit cooling fan 187, a laser unit cooling fan 188, and the charger blowing fan 189 are exemplified as control-intended parts in a second control mode, which is described below.

Figure 4:
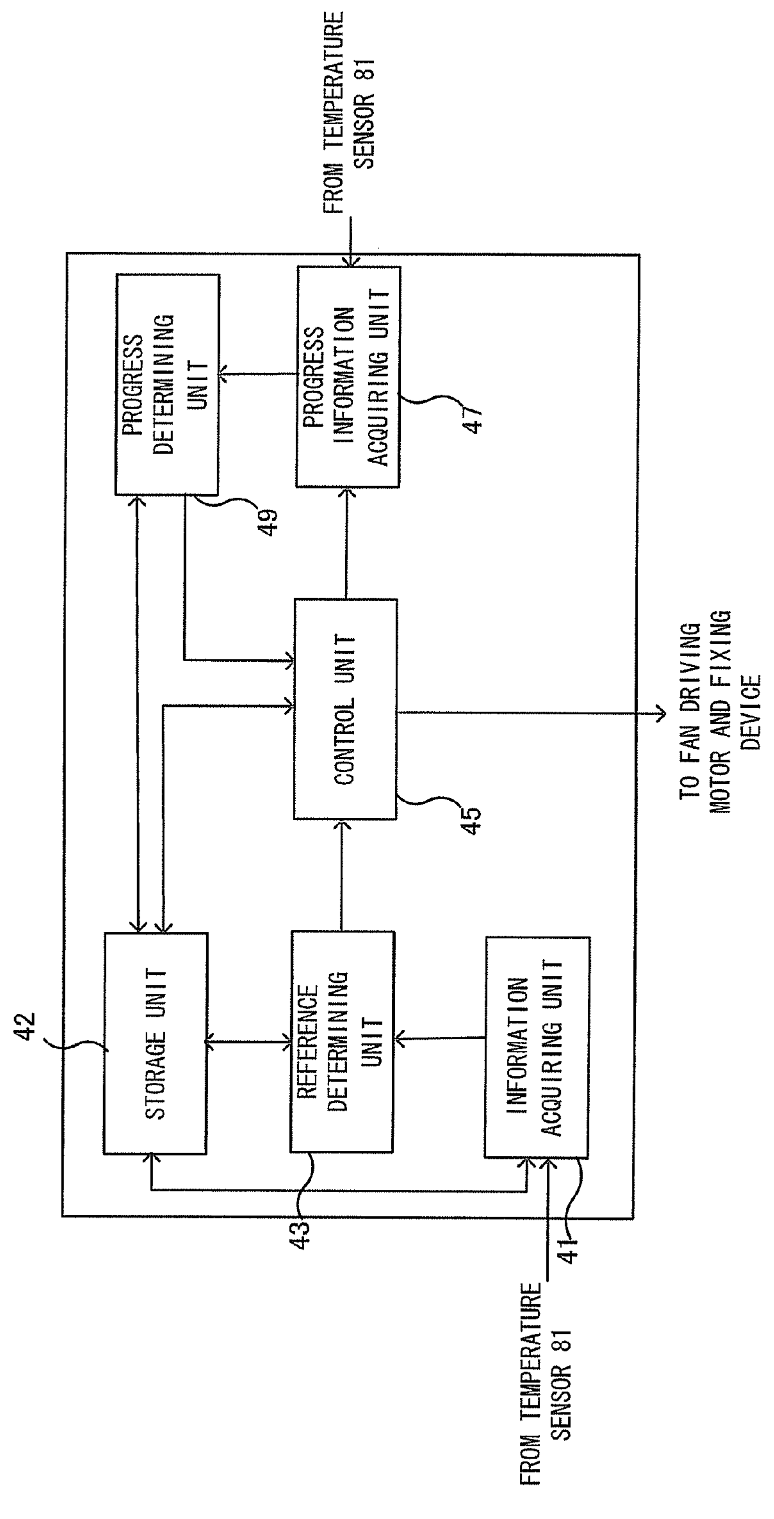
FIG. 4 is a functional block diagram relating to a sleep mode switch control in the image forming apparatus.

Next, in the image forming apparatus of the embodiment, function blocks relating to a sleep mode switch control are described with reference to FIG. 4. The image forming apparatus of the embodiment includes a storage unit 42, an information acquiring unit 41, a reference determining unit 43, a control unit 45, and a progress information acquiring unit 47. The function blocks, for example, may be implemented by executing programs read out from the memory 803 by using the CPU 801.

The storage unit 42 stores a record (log) of a print job performed in the image forming apparatus. The log of the print job includes, for example, the number of printed pages by one print job or information on print time. Further, the storage unit 42 stores information on a reference of the number of printed pages by one print job (Ps or more), a reference of print time (ts or more), and a reference of internal temperature of the image forming apparatus (Ts or more), which are references of whether a first energy saving mode, which is described below, can be implemented. Further, in the first energy saving mode described below, information on the reference of internal temperature of the apparatus (Tt or more), which is the reference of whether the rotation speed of the fan can be changed, and information on the reference of the internal temperature of the apparatus (Te) which is the reference of whether the first energy saving mode can be finished, are stored.

Further, as the print job is performed, the log of the print job is renewed by the CPU 801.

The information acquiring unit 41 acquires print process information that is information on a print process and apparatus information that is information on the environment inside the apparatus, when an operational request is not acquired for a predetermined period of time after the one print job is finished. In detail, the information acquiring unit 41 acquires the number of printed pages in the one print job or information on the print time, as the print process information, from the storage unit 42. Further, the information acquiring unit 41 acquires information on the internal temperature of the apparatus, as the apparatus information, from the temperature sensor 81. The information acquiring unit 41 transmits the acquired print process information and apparatus information, to the reference determining unit 43.

The reference determining unit 43 (corresponding to a determining unit) determines whether at least any one of the print process and the internal environment of the apparatus satisfies the reference, using the print process information and the apparatus information which are acquired by the information acquiring unit 41. In detail, the reference determining unit 43 determines whether any one of the number of printed pages, the print time, and the internal temperature of the apparatus in the one print job satisfies the reference. The reference determining unit 43 performs the determination, using the information on the reference of the number of printed pages (Ps or more), the reference of the print time (ts or more), and the reference of the internal temperature of the image forming apparatus (Ts or more), in one print job stored in the storage unit 42.

The control unit 45 controls switching to a sleep mode (corresponding to a first control mode and also called a second energy saving mode) on the basis of the result determined by the reference determining unit 43. In detail, the control unit 45 includes the first control mode (the second energy saving mode) that stops the fixing device 7 and the fan operated when the reference determining unit 43 determines that the reference is not satisfied, and a second control mode (the first energy saving mode) that stops the fixing device 7 while discharging the air containing the ozone outside the apparatus by driving the fan, when the reference determining unit 43 determines that the reference is satisfied.

Further, in the embodiment, the control unit 45 notifies the progress information acquiring unit 47 that the first energy saving mode is performed, when the first energy saving mode is performed.

The progress information acquiring unit 47 acquires progress apparatus information that is information on the environment in the apparatus while the first energy saving mode is performed. In detail, the progress information acquiring unit 47 acquires information on the internal temperature of the apparatus from the temperature sensor 81. The progress information acquiring unit 47 sends out the acquired information on the internal temperature of the apparatus to a progress determining unit 49.

The progress determining unit 49 determines whether the environment inside the apparatus satisfies the reference, using the progress apparatus information acquired by the progress information acquiring unit 47. In detail, the progress determining unit 49 determines whether the reference is satisfied, using the information on the internal temperature of the apparatus, which is acquired from the progress information acquiring unit 47.

In the embodiment, the progress determining unit 49 uses the information on the reference (Tt or more) of the internal temperature of the apparatus that is the reference of whether to be able to change the rotation speed of the fan and the information on the reference (under Te) of the internal temperature that is the reference of whether to be able to finish the first energy saving mode, stored in the storage unit 42, as the reference for the determination.

The progress determining unit 49 sends out the determined result to the control unit 45.

The control unit 45 decreases the speed of the fan or finishes the first energy saving mode and performs the second energy saving mode, when the progress determining unit 49 determines that the internal temperature of the apparatus satisfies the reference.

Figure 5:
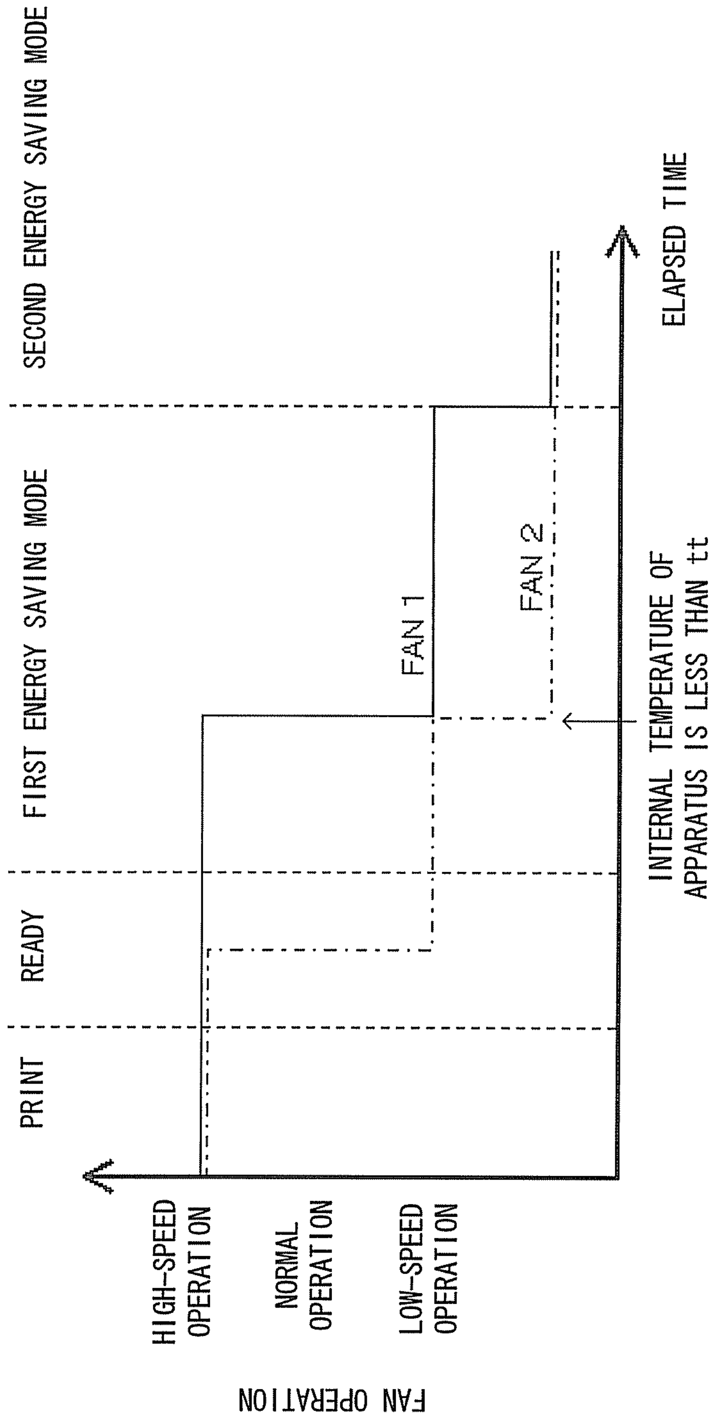
FIG. 5 is a view showing an example of a timing chart relating to driving control of the fan.

FIG. 5 is a view showing an example of a timing chart in control relating to switching to the sleep mode. In FIG. 5, FAN 1 indicates the main body-inside cooling fan 185, the EPU cooling fan 182, the charger blowing fan 189, and the ozone discharge fan 181. Further, FAN 2 indicates the SYS and HDD cooling fan 183, the power unit cooling fan 184, the scanner unit cooling fan 186, fixing and discharging unit cooling fan 187, and the laser unit cooling fan 188.

As shown in FIG. 5, when the internal temperature of the apparatus satisfies the reference (tt or less) while the first energy saving mode is performed, the control unit 45 switches speed of the FAN 1 from high-speed operation to low-speed operation (for example, to 40% speed of the speed for the high-speed operation) and switches the speed of the FAN 2 from low-speed operation to stopping (speed 0). Further, when the internal temperature of the apparatus satisfies the reference (less than Te) while the first energy saving mode is performed, the control unit 45 finishes the first energy saving mode by stopping the operation of the FAN 1.

Further, those skilled in the art can appropriately set or combine the rotation speed of the fan (control the driving speed to another step).

Figure 6:
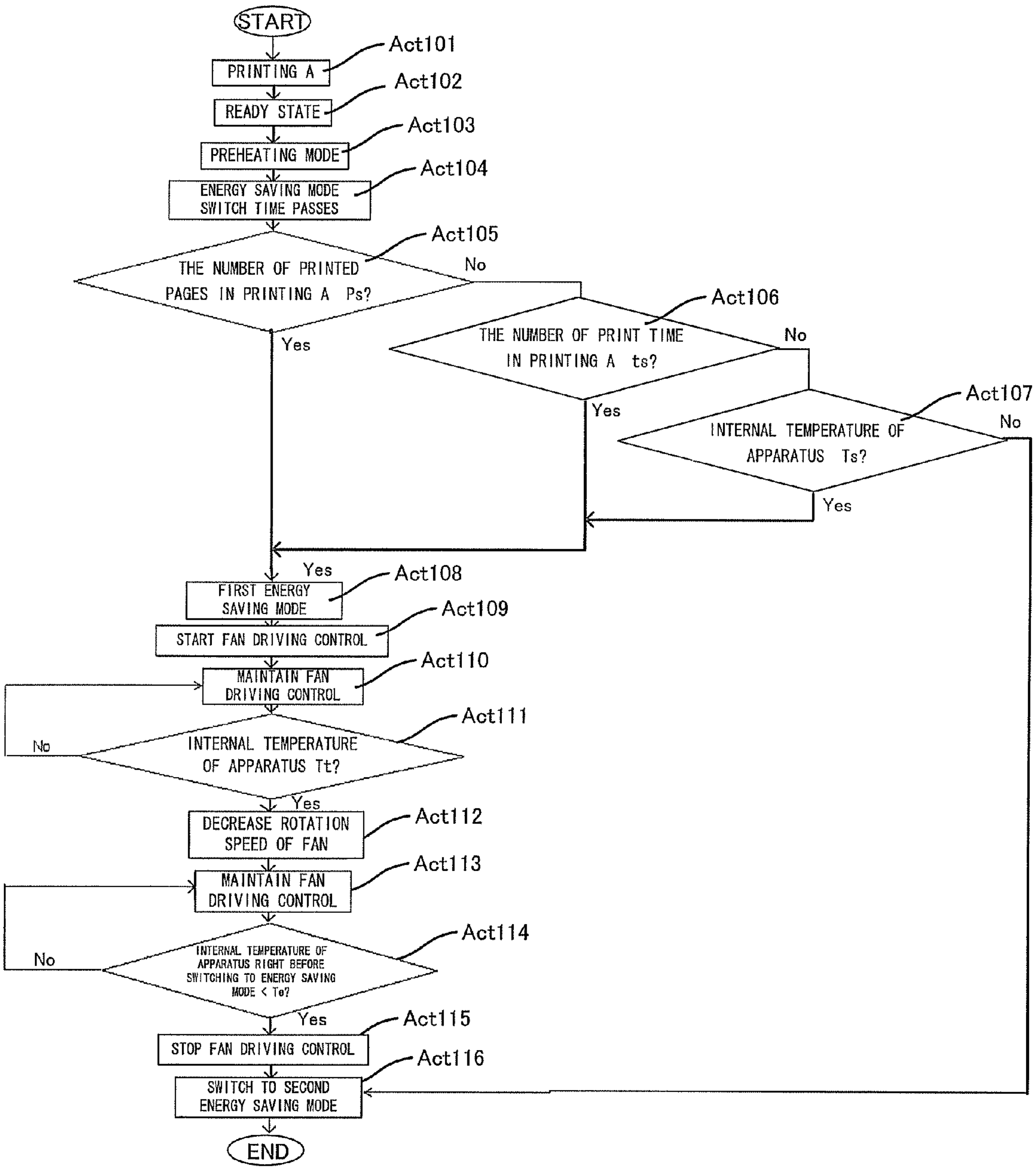
FIG. 6 is a view showing an example of a process flow relating to the sleep mode switch control.

Next, in the image forming apparatus of the embodiment, an example of a process flow relating to the sleep mode switch control will be described with reference to FIG. 6.

First, in Act 101, the CPU 801 of the image forming apparatus performs a print job (printing A in FIG. 6) in accordance with a request from a user. Next, the CPU 801 of the image forming apparatus is switched to an operation state (ready state) maintaining the temperature of the fixing device 7 while the print job is performed. Next, in Act 102, the CPU 801 of the image forming apparatus is switched to a preheating mode where the temperature of the fixing device 7 is lower than that of the ready state. Further, switching to the preheating mode may be implemented in accordance with setting after a predetermined time from when the print job is finished.

Subsequently, after a predetermined time passes from when the print job is finished, in Act 104, the information acquiring unit 41 of the image forming apparatus acquires information on the number of printed pages and the print time for the printing A from the storage unit 42. Further, the information acquiring unit 41 acquires information on the internal temperature of the apparatus from the temperature sensor 81.

Further, the timing when Act 104 is performed can be appropriately set by the user and the time until Act 104 is performed after the print job is finished may be shorter than the time until Act 103 is performed after the print job is finished. In this case, the preheating mode is not performed.

Next, the reference determining unit 43 determines whether the first energy saving mode can be performed, using the information on the print time and the number of printed pages in the printing A and the information of the internal temperature of the apparatus, acquired by the information acquiring unit 41.

In detail, in Act 105, the reference determining unit 43 determines whether the number of printed pages in the printing A is Ps or more, or not. When the number of printed pages in the printing A is less than Ps, which does not satisfy the reference, the process proceeds the Act 106. On the other hand, when the number of printed pages in the printing A is Ps or more, which satisfies the reference and the control unit 45 performs the first energy saving mode (Act 108 to 110).

In Act 106, the reference determining unit 43 determines whether the print time of the printing A is ts or more. When the print time is less than ts in the printing A, which does not satisfy the reference, process proceeds to Act 107. On the contrary, when the print time in the printing A is ts or more, which satisfies the reference, the control unit 45 performs the first energy saving mode (Act 108 to Act 110).

In Act 107, the reference determining unit 43 determines whether or not the internal temperature of the apparatus is Ts or more. When it is determined that the internal temperature of the apparatus is less than Ts, which does not satisfy the reference, the process proceeds to Act 116, and the control unit 45 finishes the process by performing the second energy saving mode (sleep mode). When it is determined that the internal temperature of the apparatus is Ts or more in Act 107, which satisfies the reference, the control unit 45 performs the first energy saving mode (Act 108 to Act 110).

In Act 111, the progress determining unit 49 determines whether the reference (tt or less) is satisfied, using the information on the internal temperature of the apparatus during the first energy saving mode which is acquired by the progress information acquiring unit 47. When the internal temperature of the apparatus is higher than tt, the process returns to Act 110 and maintains the rotation speed of the fan.

In Act 111, when the progress determining unit 49 determines that the internal temperature of the apparatus satisfies the reference (tt or less), in Act 112, the control unit 45 decreases the rotation speed of the fan and continuously discharges the ozone (Act 113).

In Act 114, the progress determining unit 49 determines whether the reference (less than Te) is satisfied, using the information on the internal temperature of the apparatus during the first energy saving mode which is acquired by the progress information acquiring unit 47. When the internal temperature of the apparatus is Te or more, the process proceeds to Act 113 and the first energy saving mode is continuously performed.

In Act 114, when the internal temperature of the apparatus is less than Te, the control unit 45 finishes the first energy saving mode (stops driving control of the fan) in Act 115. Further, in Act 116, the control unit 45 finishes the process by performing the second energy saving mode.

Another Embodiment

In the above, although one embodiment is described, the present invention is not limited thereto and may be implemented by other embodiments.

Figure 7:
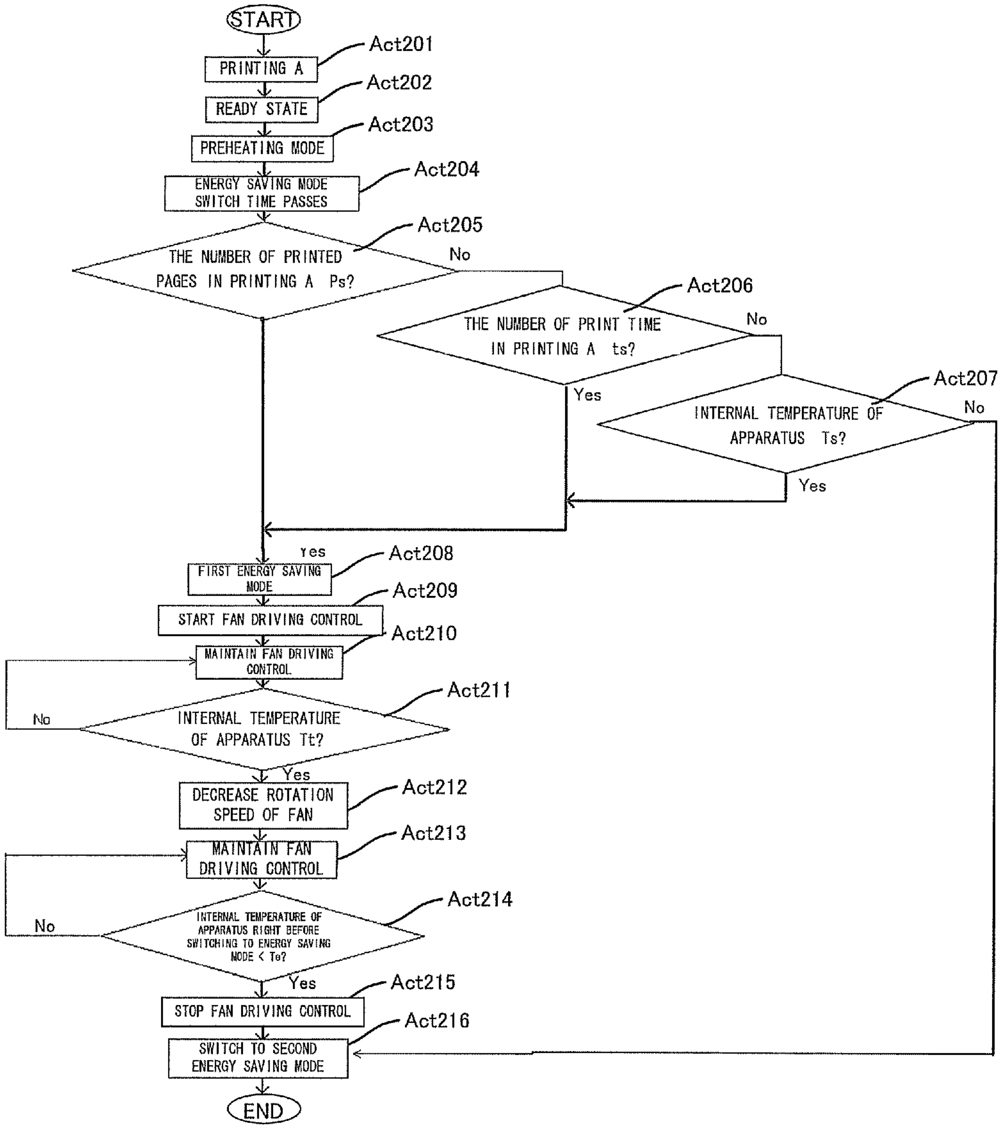
FIG. 7 is a view showing an example of a process flow relating to a sleep mode switch control in an image forming apparatus of another embodiment.

For example, when the first energy saving mode is performed, although the control unit 45 performs the process of decreasing the rotation speed of the fan when the internal temperature of the apparatus is tt or less, this is not limitative, and for example, as shown in FIG. 7, it may be possible to perform a process of decreasing the rotation speed of the fan after a predetermined period of time te passes from when the first energy saving mode is started.

Figure 8:
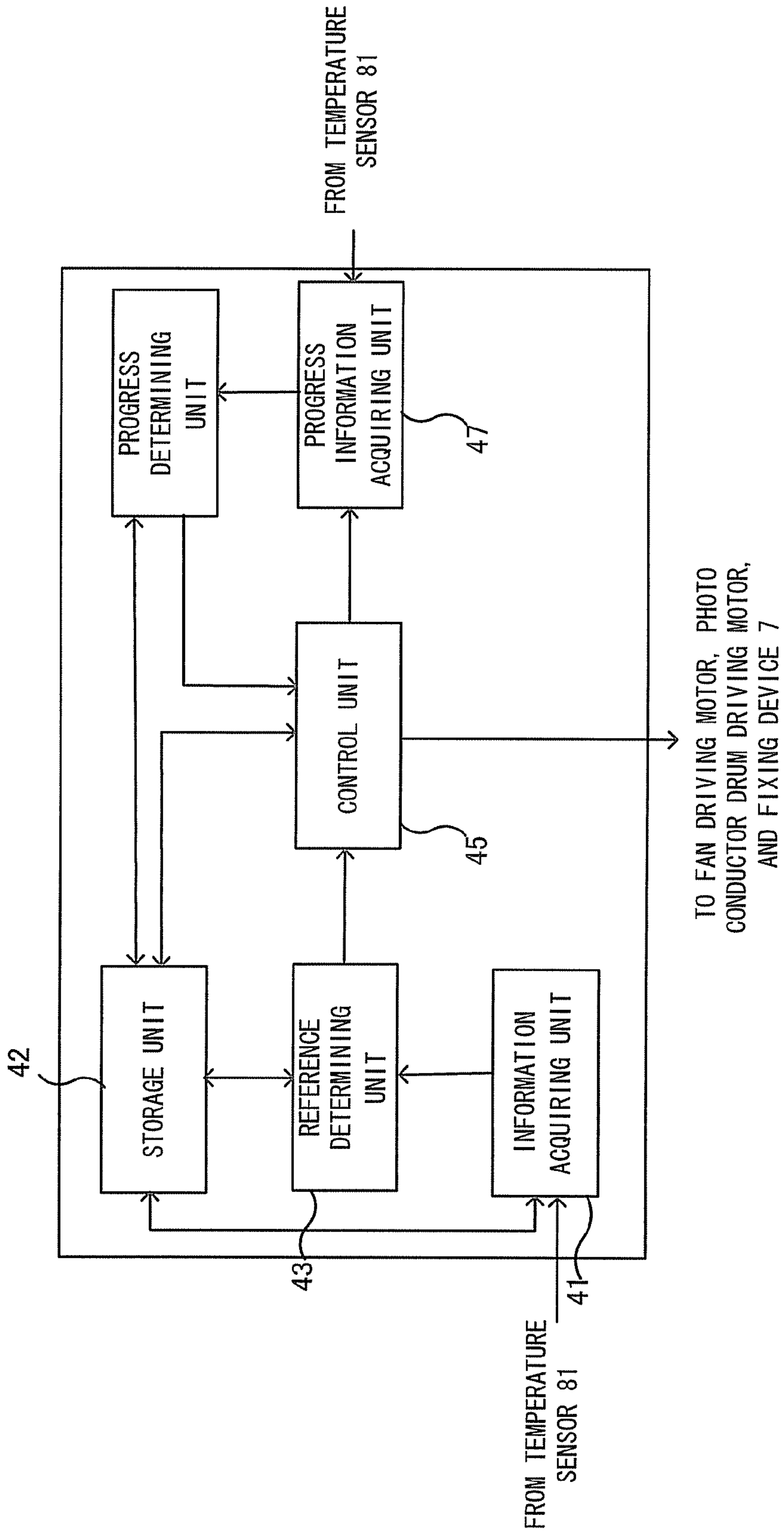
FIG. 8 is a functional block diagram relating to a sleep mode switch control in an image forming apparatus of another embodiment.

Further, as shown in FIG. 8, the control unit 45 may rotate one or more of the photo conductor drums 2Y to 2K by controlling a driving motor, which is not shown in the figure, of the photo conductor drums, when performing the first energy saving mode (idling control). It is possible to prevent non-uniform condensation from being generated during printing due to influence on the photo conductor drums 2Y to 2K by the ozone, by performing the idling control. The idling control, for example, may be performed such that the photo conductor drums are rotated by a predetermined phase, or such that the photo conductor drums are rotated for a predetermined period of time. Further, the idling control may be performed, corresponding to the rotation speed of the charger blowing fan 189. For example, when the charger blowing fan 189 rotates in two steps of high-speed operation and low-speed operation in the first energy saving mode, the idling control may be performed when the charger blowing fan 189 is driven in the low-speed operation. Therefore, it is possible to more effectively prevent the influence on the photo conductor drums due to the ozone.

Further, in the embodiment, the first energy saving mode is performed, when it is determined that the reference for the number of printed pages in one print job, the print time in one print job, or the internal temperature of the apparatus is satisfied. As an another embodiment, it may be possible to determine whether to perform the first energy saving mode on the basis of the result that determines whether any one of the number of printed pages in one print job, the print time in one print job, or the internal temperature of the apparatus satisfies the reference.

That is, the information acquiring unit acquires at least one of the print process information that is the information on the print process and the apparatus information that is the information on the environment inside the apparatus. The reference determining unit determines whether the print process or the environment of the apparatus satisfies the reference, using at least any one of the print process information and the apparatus information which are acquired by the information acquiring unit.

Further, in the embodiment, switching to the sleep mode is started after a predetermined period of time passes from when the print job is finished. In more detail, the print process information or apparatus information is acquired by the information acquiring unit 41 after a predetermined period of time passes from when the print job is finished. However, though not limited, for example, the print process information or apparatus information may be acquired by the information acquiring unit 41 when the request for switching to the sleep mode is input, for example through the operation unit 15, by the user after the print job is finished and the image forming apparatus acquires the request.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and method described herein may be made without departing from the spirit of the inventions. The accompanying claims and their equivalents are intended to cover such forms or modifications as would fall within the scope and spirit of the inventions.

As described above, according to the embodiments described herein, discharging of ozone from the inside of the image forming apparatus after the print job is finished is enhanced, therefore, it is possible to prevent the members of the image forming apparatus from being deteriorated.

What is claimed is:

1. An image forming apparatus includes:

a photo conductor;

a charging unit that charges a surface of the photo conductor;

a fixing device that fixes a toner image transferred on a recording medium from the photo conductor;

a plurality of fans that discharge air containing ozone produced by charging of the charging unit to the outside of the apparatus, by generating a flow of the air from the inside of the apparatus to the outside of the apparatus;

an information acquiring unit that acquires at least any one of print process information, which is information on a print process, and apparatus information, which is information on the internal environment of the apparatus;

a determining unit that determines the print process or the internal environment of the apparatus by using at least any one of the print process information and the apparatus information that are acquired by the information acquiring unit; and an operation control unit including a first control mode that is performed in accordance with the determined result of the determining unit and stops the fans and the fixing device and a second control mode that is performed before the first control mode is performed and stops the fixing device while driving the fans;

a progress information acquiring unit acquiring progress apparatus information that is information on the environment inside of the apparatus while the second control mode is performed, when the second control mode starts to be performed by the control unit; and a progress determining unit that determines whether the environment inside the apparatus satisfies the reference by using the progress apparatus information acquired by the progress information acquiring unit, wherein the control unit stops performing the second control mode and performs the first control mode when the progress determining unit determines that the environment inside the apparatus satisfies the reference.

2. The apparatus according to claim 1, wherein the information acquiring unit acquires the print process information or the apparatus information, when an operation request is not acquired for a predetermined period of time after one print job is finished, or when the image forming apparatus acquires a user request for performing the first control mode by the control unit.

3. The apparatus according to claim 1, wherein the print process information is information on at least any one of the number of printed pages and printing time, in one finished print job.

4. The apparatus according to claim 1, wherein the apparatus information is information on an internal temperature of the apparatus.

5. An image forming apparatus includes:

a photo conductor;

a charging unit that charges a surface of the photo conductor;

a fixing device that fixes a toner image transferred on a recording medium from the photo conductor;

a plurality of fans that discharge air containing ozone produced by charging of the charging unit to the outside of the apparatus, by generating a flow of the air from the inside of the apparatus to the outside of the apparatus;

an information acquiring unit that acquires at least any one of print process information, which is information on a print process, and apparatus information, which is information on the internal environment of the apparatus;

a determining unit that determines the print process or the internal environment of the apparatus by using at least any one of the print process information and the apparatus information that are acquired by the information acquiring unit; and an operation control unit including a first control mode that is performed in accordance with the determined result of the determining unit and stops the fans and the fixing device and a second control mode that is performed before the first control mode is performed and stops the fixing device while driving the fans;

a progress information acquiring unit that acquires progress apparatus information that is information on the environment inside of the apparatus while the second control mode is performed, when the second control mode is started by the operation control unit; and a progress determining unit that determines whether the environment inside the apparatus satisfies the reference by using the progress apparatus information acquired by the progress information acquiring unit, wherein the control unit decreases the number of revolutions of the fan, when the progress determining unit determines that the environment inside the apparatus satisfies the reference.

6. The apparatus according to claim 1, wherein the photo conductor is a photo conductor drum that is operably arranged, and the control unit rotates the photo conductor drum while performing the second control mode.

7. An operation control method of an image forming apparatus includes: a photo conductor; a charging unit that charges a surface of the photo conductor; a fixing device that fixes a toner image transferred on a recording medium from the photo conductor; and a plurality of fans that discharge air containing ozone produced by charging of the charging unit outside the apparatus, by generating a flow of the air from the inside of the apparatus to the outside of the apparatus, the method comprising:

acquiring at least any one of print process information, which is information on a print process, and apparatus information that is information on the internal environment of the apparatus;

determining the print process or the internal environment of the apparatus by using at least any one of the acquired print process information and the acquired apparatus information;

performing a first control mode that stops the fans and the fixing device in accordance with the determined result or a second control mode that is performed before the first control mode is performed and stops the fixing device while driving the fans;

acquiring progress apparatus information that is information on the environment inside of the apparatus while the second control mode is performed, when the second control mode starts to be performed;

determining whether the environment inside the apparatus satisfies the reference by using the acquired progress apparatus information; and finishing performing the second control mode and performing the first control mode when it is determined that the environment inside the apparatus satisfies the reference.

8. The method according to claim 7, wherein the print process information or the apparatus information is acquired, when an operation request is not acquired for a predetermined period of time after one print job is finished, or when the image forming apparatus acquires a user request for performing the first control mode.

9. The method according to claim 7, wherein the print process information is information on at least any one of the number of printed pages and the printing time, in one finished print job.

10. The methods according to claim 7, wherein the apparatus information is information on an internal temperature of the apparatus.

11. An operation control method of an image forming apparatus includes: a photo conductor; a charging unit that charges a surface of the photo conductor; a fixing device that fixes a toner image transferred on a recording medium from the photo conductor; and a plurality of fans that discharge air containing ozone produced by charging of the charging unit outside the apparatus, by generating a flow of the air from the inside of the apparatus to the outside of the apparatus, the method comprising:

acquiring at least any one of print process information, which is information on a print process, and apparatus information that is information on the internal environment of the apparatus;

determining the print process or the internal environment of the apparatus by using at least any one of the acquired print process information and the acquired apparatus information;

performing a first control mode that stops the fans and the fixing device in accordance with the determined result or a second control mode that is performed before the first control mode is performed and stops the fixing device while driving the fans;

acquiring progress apparatus information that is information on the environment inside of the apparatus while the second control mode is performed, when the second control mode starts to be performed;

determining whether the environment inside the apparatus satisfies the reference by using the acquired progress apparatus information; and decreasing the number of revolutions of the fan, when it is determined that the environment inside the apparatus satisfies the reference.

12. The method according to claim 7, wherein the photo conductor is a photo conductor drum that is operably arranged, and the photo conductor drum is rotated while the second control mode is performed.

* * * * *